US009600918B2

(12) United States Patent
Wiemker et al.

(10) Patent No.: US 9,600,918 B2
(45) Date of Patent: Mar. 21, 2017

(54) DELINEATION AND/OR CORRECTION OF A SMOOTH STIFF LINE IN CONNECTION WITH AN INDEPENDENT BACKGROUND IMAGE

(71) Applicant: KONINKLIJKE PHILIPS N.V., Eindhoven (NL)

(72) Inventors: Rafael Wiemker, Kisdorf (DE); Tobias Klinder, Uelzen (DE); Daniel Bystrov, Hamburg (DE); Torbjorn Vik, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/784,677

(22) PCT Filed: Apr. 9, 2014

(86) PCT No.: PCT/IB2014/060542
§ 371 (c)(1),
(2) Date: Oct. 15, 2015

(87) PCT Pub. No.: WO2014/170798
PCT Pub. Date: Oct. 23, 2014

(65) Prior Publication Data
US 2016/0063745 A1    Mar. 3, 2016

Related U.S. Application Data

(60) Provisional application No. 61/812,965, filed on Apr. 17, 2013.

(51) Int. Cl.
*G06T 11/20*    (2006.01)
*G06T 11/60*    (2006.01)
(Continued)

(52) U.S. Cl.
CPC .......... *G06T 11/60* (2013.01); *G06F 3/04883* (2013.01); *G06T 7/0012* (2013.01);
(Continued)

(58) Field of Classification Search
CPC .......................... G06F 19/3425; G06T 11/203
See application file for complete search history.

(56) References Cited

U.S. PATENT DOCUMENTS 5,877,743 A * 3/1999 Dzik ..................... G06T 11/203
345/611
6,233,351 B1 * 5/2001 Feeney .............. G06K 9/00416
345/522
(Continued)

OTHER PUBLICATIONS

Baudel, T.; A Mark-Based Interaction Paradigm for Free-Hand Drawing; 1994; Symposium on User Interface Software and Technology; pp. 185-192.
(Continued)

*Primary Examiner* — Phi Hoang

(57) ABSTRACT

A method includes displaying a background image on a display screen. The method further includes receiving, from an input device, a signal indicative of a free hand line being drawn over the background image. The signal includes coordinates of points of the free hand line with respect to the display screen. The free hand line is independent of content represented in the background image. The method further includes storing the signal in a storage device. The method further includes generating a smooth stiff line based on the stored signal. The method further includes displaying the smooth stiff line over the background image.

20 Claims, 4 Drawing Sheets

Figure 1:
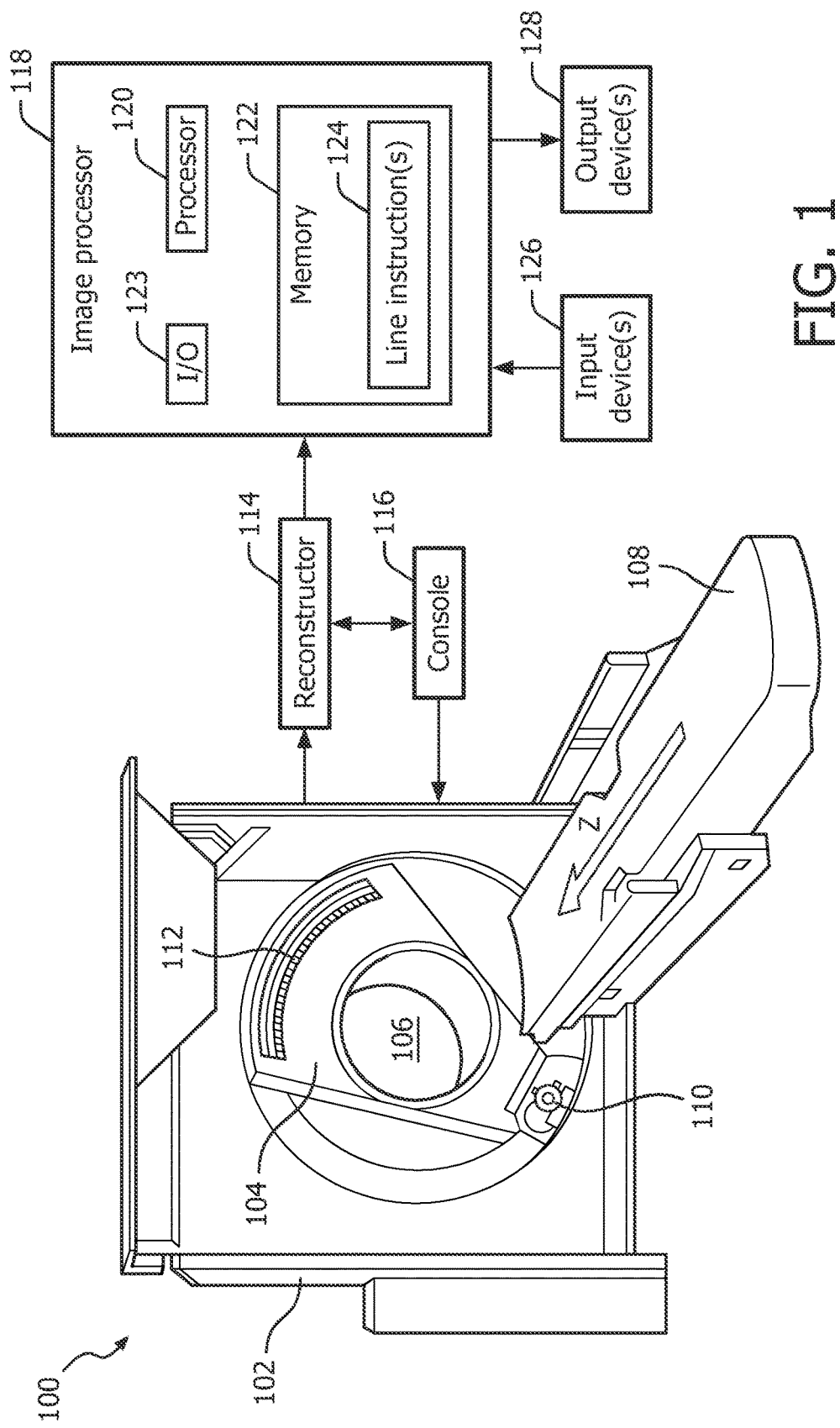

(51) Int. Cl.
*G06F 3/0488* (2013.01)
*G06T 7/00* (2006.01)
*G06T 11/00* (2006.01)

(52) U.S. Cl.
CPC .......... *G06T 11/003* (2013.01); *G06T 11/203* (2013.01); *G06T 2200/24* (2013.01); *G06T 2207/10081* (2013.01); *G06T 2207/30061* (2013.01)

(56) References Cited

U.S. PATENT DOCUMENTS

| | | | |
|---|---|---|---|
| 6,310,623 B1 | 10/2001 | Zhang | |
| 7,609,278 B1* | 10/2009 | Dash | G06F 3/0481 345/418 |
| 7,793,217 B1* | 9/2010 | Kim | G06F 19/3425 715/255 |
| 2004/0028274 A1 | 2/2004 | Kawakami et al. | |
| 2007/0133848 A1 | 6/2007 | McNutt et al. | |
| 2009/0310835 A1 | 12/2009 | Kaus et al. | |
| 2011/0064289 A1* | 3/2011 | Bi | G06T 7/0012 382/128 |
| 2012/0035463 A1 | 2/2012 | Pekar et al. | |
| 2012/0200560 A1* | 8/2012 | Masumoto | G06T 19/20 345/419 |
| 2013/0135305 A1* | 5/2013 | Bystrov | G06T 7/0079 345/420 |

OTHER PUBLICATIONS

Elliott, P. J., et al.; Interactive image segmentation for radiation treatment planning; 1992; IBM Systems Journal; 31(4)620-634.

HU, Y-C., et al.; Interactive semiautomatic contour delineation using statistical conditional random fields framework; 2012; Med. Phys.; 39(7)4547-4558.

* cited by examiner

DELINEATION AND/OR CORRECTION OF A SMOOTH STIFF LINE IN CONNECTION WITH AN INDEPENDENT BACKGROUND IMAGE

CROSS REFERENCE TO RELATED APPLICATIONS

This application is a national filing of PCT application Serial No. PCT/IB2014/060542, filed Apr. 9, 2014, published as WO 2014/170798 A1 on Oct. 23, 2014, which claims the benefit of U.S. provisional application Ser. No. 61/812,965 filed Apr. 17, 2013, which is incorporated herein by reference.

The following generally relates to image processing and more particularly to delineating and/or correcting a smooth stiff line in connection with an independent background image, and is described with particular application to computed tomography (CT). However, the following is also amenable to other imaging modalities such as magnetic resonance imaging (MM), Positron Emission Tomography (PET), Single Photon Emission Computed Tomography (SPECT), digital radiography, and/or other imaging modality.

Medical imaging has provided useful information about the interior characteristics of an object or subject under examination. A CT scanner generally includes an x-ray tube supported by a rotating frame. The rotating frame and the x-ray tube rotate around an examination region, and the x-ray tube emits radiation that traverses the examination region. A radiation sensitive detector is located opposite the x-ray tube, across the examination region, and detects radiation that traverses the examination region. The radiation sensitive detector generates a signal indicative of the detected radiation. A reconstructor reconstructs the signal, generating volumetric image data. An image processor can be used to process the volumetric image data and generate one or more images.

With some clinical applications, the delineation of certain organs or organ parts (e.g., pulmonary fissures between the five lung lobes) represented in the image data is a necessary prerequisite. This task has been carried out by automatic unsupervised image processing. Even with latest advances in automated image processing, automatic (and even semi-automatic) delineation still fails on a considerable number of cases. In semi-automatic delineation, the contour line is drawn interactively, but with smart input derived from the underlying image content (e.g. "life-wire delineation"). Semi-automatic delineation is effective when the image content of the object to be segmentation is clearly present, so that the user input 'guides' the algorithm to the correct border.

However, there are applications where semi-automatic delineation is not useful or desired. For example, in cases where the image content is so difficult to interpret that only an experienced radiologist is able to draw the correct border, it may be better to completely rely on user-input rather than on the image content, which might only be misleading. In this case, semi-automatic suggestions by image processing algorithms are more time-consuming than helpful, as the user constantly has to correct erroneous suggestions by the algorithms. Furthermore, it can be particularly time consuming and tedious if the user is forced to switch between a drawing mode and a correction mode (e.g. an "eraser rubber" or shifting certain control points).

Aspects described herein address the above-referenced problems and others.

In one aspect, a method includes displaying a background image on a display screen. The method further includes receiving, from an input device, a signal indicative of a free hand line being drawn over the background image. The signal includes coordinates of points of the free hand line with respect to the display screen. The free hand line is independent of content represented in the background image. The method further includes storing the signal in a storage device. The method further includes generating a smooth stiff line based on the stored signal. The method further includes displaying the smooth stiff line over the background image.

In another aspect, an image processor includes a memory that stores coordinates of points of a free hand line being drawn over a background image visually presented on a display. The free hand line is independent of content represented in the background image. The image processor further includes a processor that generates and displays a smooth stiff line over the background image based on the stored coordinates of the points of the free hand line being drawn over the background image.

In another aspect, a computer readable storage medium is encoded with computer readable instructions. The computer readable instructions, when executed by a processer, causes the processor to: display a background image on a display, wherein the background image include pixels that represent a lung of a subject, receive, from an input device, a coordinates of points of a wiggly free hand line being drawn over a fissure represented in the background image, wherein the wiggly free hand line is independent of content of the lung in the background image, store the coordinates of points in a storage device, process the coordinates of the points in the storage device to remove coordinates that correspond to an erased segment of the wiggly free hand line, process the coordinates of the points in the storage device to remove coordinates that result in the coordinates failing a predetermined stiffness criteria, generate a smooth stiff line representing the fissure based on the remaining stored coordinates, and display the smooth stiff line over the background image with respect to the fissure, wherein the stored coordinates of points are not displayed over the background image.

The invention may take form in various components and arrangements of components, and in various steps and arrangements of steps. The drawings are only for purposes of illustrating the preferred embodiments and are not to be construed as limiting the invention.

FIG. 1 schematically illustrates an imaging system in connection with an image data processor.

Figure 2:
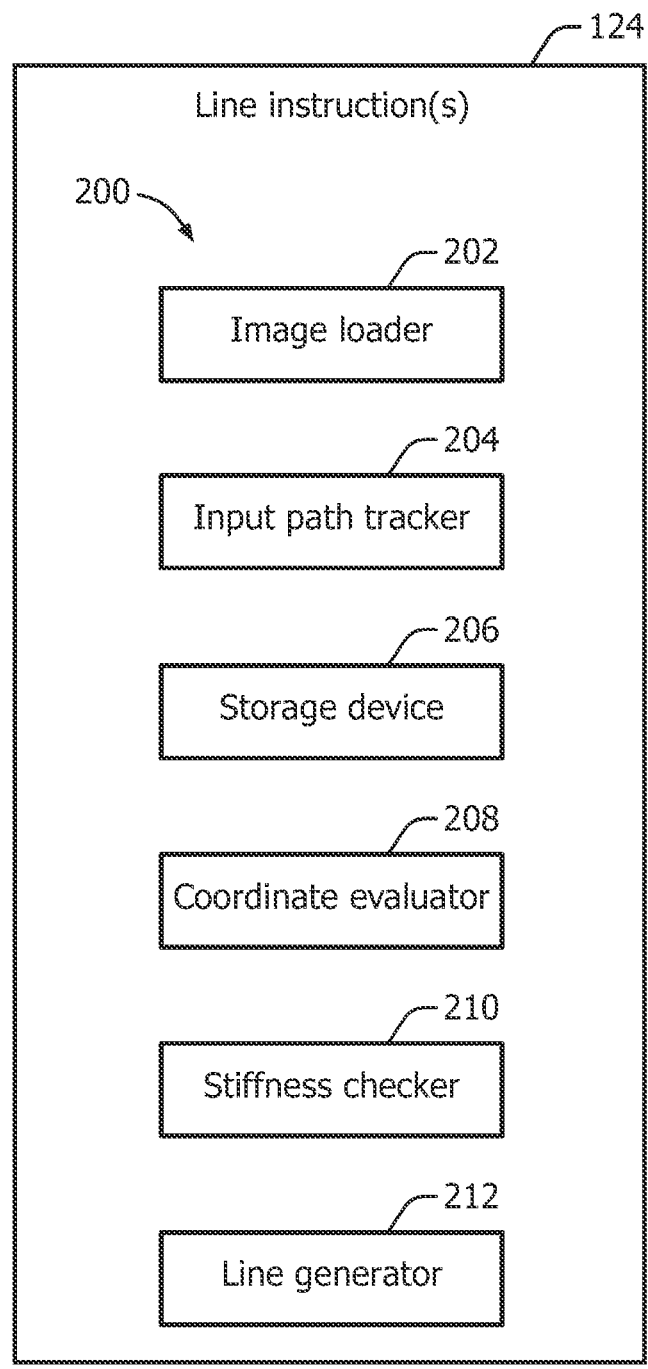

FIG. 2 schematically illustrates an example of the image data processor in connection with processing an image.

Figure 3:
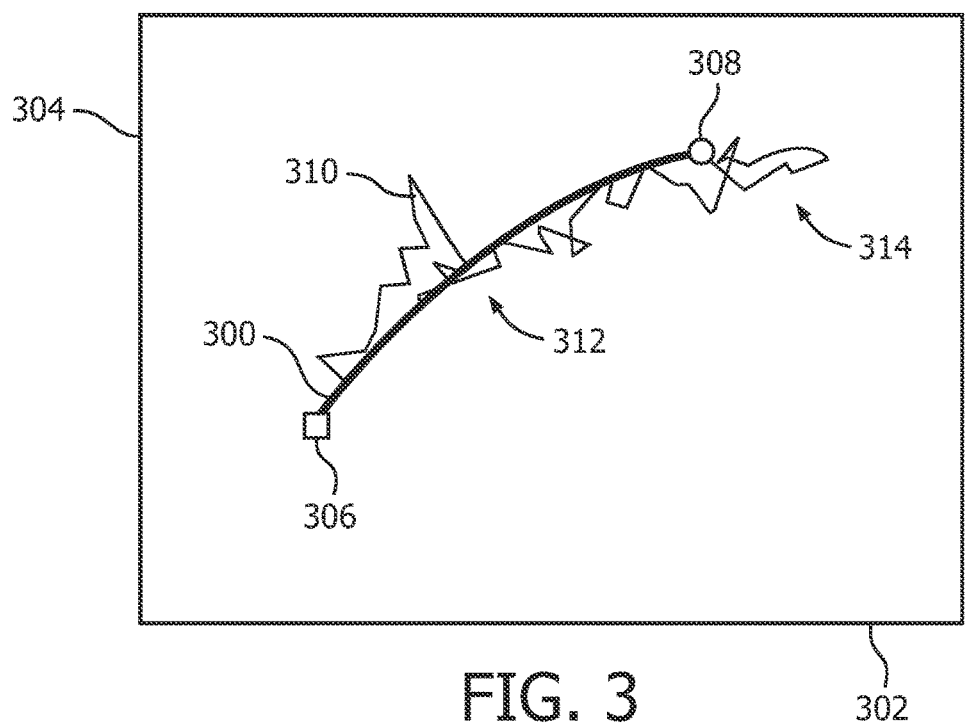

FIG. 3 graphically illustrates an example of a generated and rendered smooth stiff line in connection with a wiggly free hand drawn line used to create the smooth stiff line.

Figure 4:
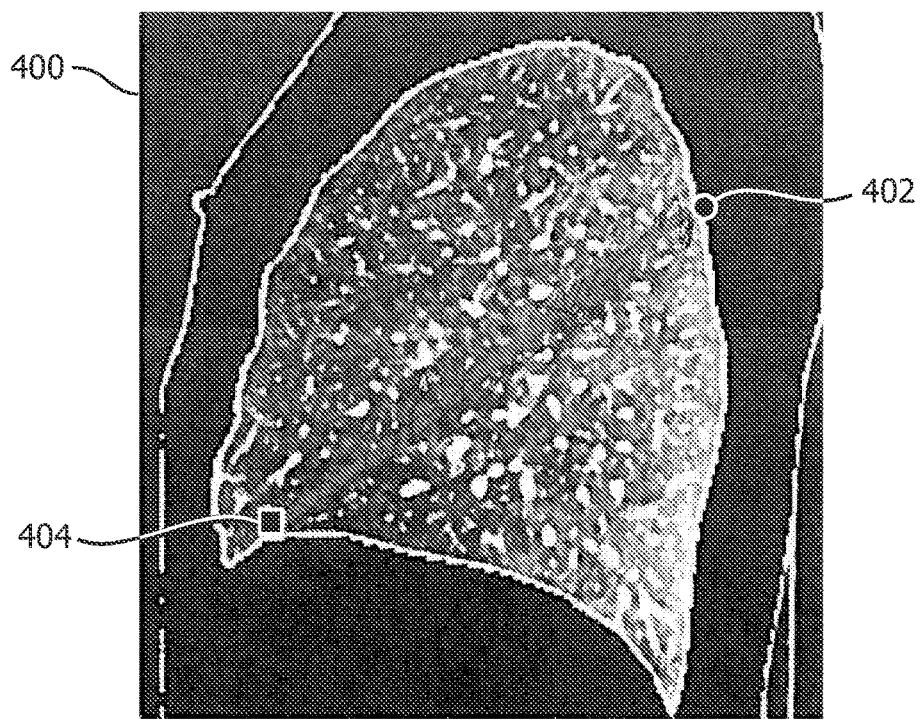

FIG. 4 graphically illustrates an example of a generated and rendered smooth stiff line over a background CT image in connection with a wiggly free hand drawn line used to create the smooth stiff line.

Figure 5:
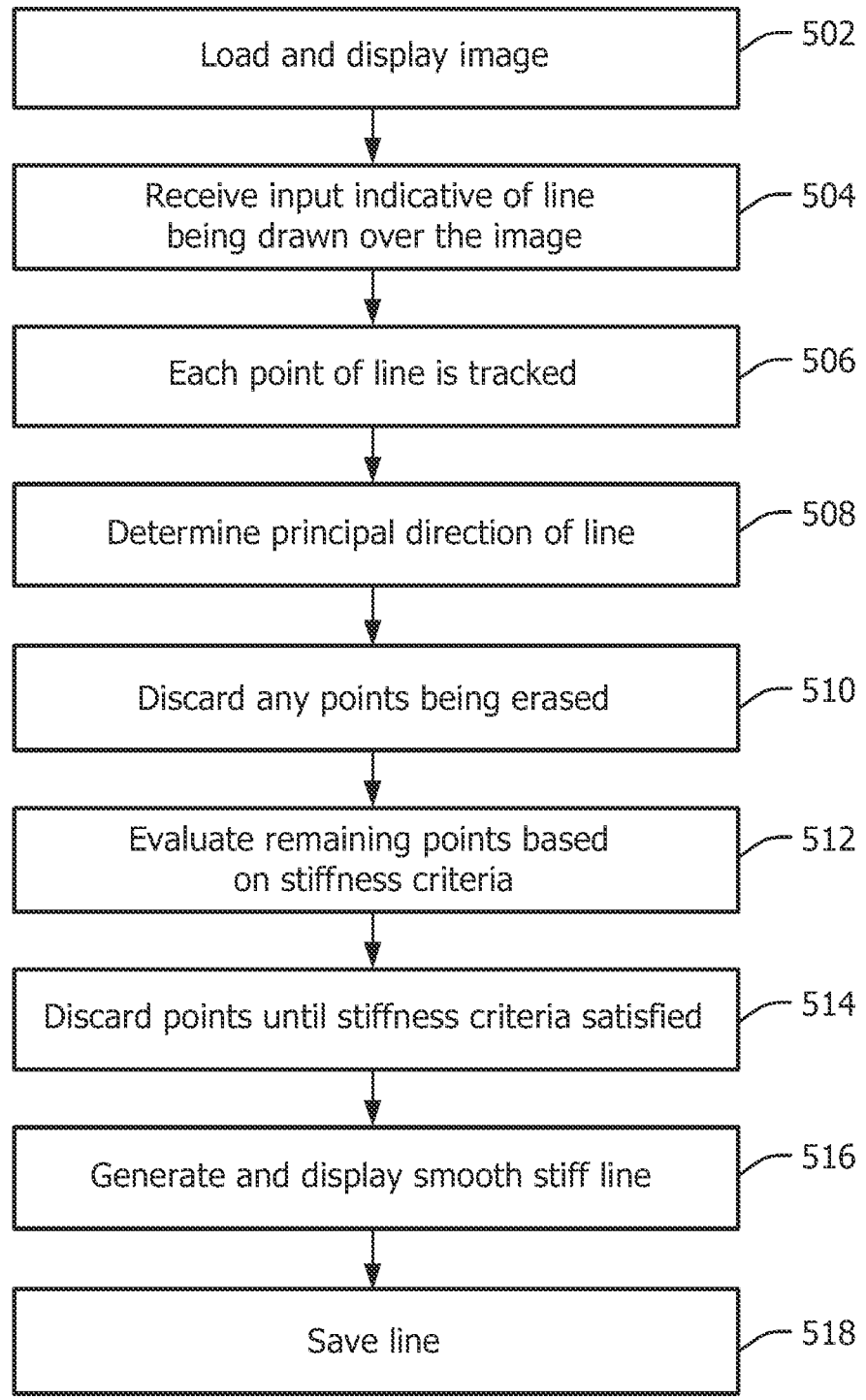

FIG. 5 illustrates an example method for creating a smooth stiff line from a wiggly free hand drawn line.

Initially referring to FIG. 1, an imaging system 100 such as a CT scanner is illustrated. The imaging system 100 includes a generally stationary gantry 102 and a rotating gantry 104, which is rotatably supported by the stationary gantry 102 and rotates around an examination region 106 about a z-axis. A subject support 108, such as a couch, supports an object or subject in the examination region 106.

A radiation source 110, such as an x-ray tube, is rotatably supported by the rotating gantry 104, rotates with the rotating gantry 104, and emits radiation that traverses the examination region 106. A radiation sensitive detector array 112 subtends an angular arc opposite the radiation source 110 across the examination region 106. The radiation sensitive detector array 112 detects radiation traversing the examination region 106 and generates a signal indicative thereof for each detected photon.

A reconstructor 114 reconstructs the projection, generating volumetric image data indicative of a scanned portion of a subject or object located in the imaging region 106. A general-purpose computing system or computer serves as an operator console 116. The console 116 includes a human readable output device such as a monitor and an input device such as a keyboard, mouse, etc. Software resident on the console 116 allows the operator to interact with and/or operate the scanner 100 via a graphical user interface (GUI) or otherwise.

An image processor 118 includes at least one processor 120 that executes at least one computer readable instruction stored in computer readable storage medium, such as physical memory 122 or other non-transitory storage medium. In the illustrated embodiment, the at least one computer readable instruction includes a delineating a line and/or correcting the line instruction(s) 124. This instruction(s) can be employed with an image created with image data generated by the imaging system 100 and/or other system. The processor 120 may also executes one or more computer readable instructions carried by a carrier wave, a signal or other transitory medium.

As described in greater detail below, in one non-limiting instance, the delineating a line and/or correcting the line instruction(s) 124 provides a user interface tool which facilitates manual delineation of a feature such as a line, line segments, etc. over a background image (independent of the structural content represented in the image), with automatic smoothing and stiffness of the feature based on predetermined stiffness constraint criteria. In one instance, the manual delineation is independent of the structural content represented in the image, except, for example, the user is trying to follow a line he feels he can discern visually in the image. The tool may be part of or an add-on to an existing executing GUI and/or a separately executed program. Note that the feature can be delineated by drawing a line with an input device such as a mouse, a trackball, a stylus, a activation of a touch sensitive region of a touchscreen, etc.

Also described in greater detail below, in one non-limiting instance, the delineating a line and/or correcting the line instruction(s) 124 allows for correction of a delineated feature (e.g., at any point during or after delineation of the feature) by back-tracking or back tracing about a path approximately following the delineated feature, which "undoes" or removes the back-traced portion of the delineated feature without having to switch from a delineation mode to a correction mode. This allows for faster correction of a feature relative to a configuration which requires switching from a delineation mode to a correction mode to perform a correction operation on a feature.

It is to be appreciated that the foregoing allows for interactive segmentation (e.g., in connection with delineation of the pulmonary fissures between the five lung lobes and/or other delineation of another region(s) of interest of another object(s)) and correction, which mitigates situations in which automatic or semi-automatic delineation fail such as where the image content is difficult to interpret (which tend to include cased of higher interest) and may lead to error and reduces delineation time since there is no switching between delineation and correction modes.

The image processor 118 can be part of a computing system such as a dedicated visualization computer, a smart-phone, a tablet computer, or the like, which is separate from the imaging system 100. Additionally or alternatively, the image processor 118 can be part of the console 116. Input/output (I/O) 123 is configured to receive information from one or more input devices 126 (e.g., a keyboard, a mouse, etc.) and/or convey information (e.g., a Graphical User Interface (GUI) and information therein in display regions) to one or more output devices 128 (e.g., a monitor, a filmer, portable memory, etc.).

FIG. 2 schematically illustrates an example of modules 200 of the delineating a line and/or correcting the line instruction(s) 124.

An image loader 202 receives an image to load and loads and visually presents the image in an image viewing port of a displayed GUI. The image viewing port can be a port of an already executing GUI, a pop-up view port overlaid over an already executing GUI, and/or other information viewing port. The particular image may be created from the volumetric image data with the image processor 118 based on a input indicative of a user identified 2D slice (e.g., axial, sagittal, coronal, curved, oblique, etc.) of interest from the image data, received as an input image, and/or otherwise obtained.

An input path tracker 204 tracks a path being created over the loaded and displayed image. As discussed herein, the path is created with the input device 126 and is fully independent of the displayed image and the structural content therein in that the image is only a background image and cannot be used to auto or semi-automatically generate the path based on content such as contours, gradients, gray scale values, etc. therein. The tracking includes identifying coordinates of the points (e.g., x,y) on the path, as the path is being drawn, with respect to a geometry of the display screen of the viewport.

A storage device 206 stores the identified coordinates of the path in a list or the like.

A coordinate evaluator 208 evaluates the stored points and determines whether successive points add to (or extend) the line being drawn or subtract from (or erase) the line being drawn. Points that add to the line being drawn are retained in the list, and points that subtract from the line being drawn are removed from the list.

In one instance, the coordinate evaluator 208 does this by determining whether a most recently received point adds to or subtracts from the line being drawn by determining a principal direction of the line based on the points in the list and then determining whether any of the points in the list lies beyond the most recently received point, with respect to the principal direction. The principal line can be computed from (a) the last N added points, (b) the N points which are within a certain radius of the last added point, (c) the N points which have been added within a certain time span before the last added point, and/or otherwise.

If a point does not lie beyond the most recently received point, the coordinate evaluator 208 determines the line is being extended. If a point lies beyond the most recently received point, the coordinate evaluator 208 determines the line is being corrected. In this case, points before the most recently received point are successively removed from the list until no point lies beyond the most recently received point.

The above allows for drawing (starting and adding to) and correcting (or removing from) the line while in the same mode and not having to switch between a line creation mode and a line correcting mode. In addition, to correct the line, the user does not have to precisely follow the drawn line.

A stiffness checker 210 determines whether the coordinates in the list updated by the coordinate evaluator 208 satisfies predetermined stiffness criteria. Points the lead to failing the predetermined stiffness criteria are removed from the list. In one instance, the stiffness checker 210, if the list fails the predetermined stiffness criteria, successively removes points before the most recently received point until the list of points satisfies the predetermined stiffness criteria.

Generally, the predetermined stiffness criteria defines an allowable radius of curvature of the rendered smooth stiff line. In one instance, the predetermined stiffness criteria is a default value. In another instance, the predetermined stiffness criteria corresponds to the object being traced as different objects have different line of interest which may be more or less curved. In this instance, the more straight (or less curved) the object is, the smaller the angle of curvature will be. In yet another instance, the predetermined stiffness criteria can be adjusted, before and/or during delineation of the line, by a user of the input device 126 drawing the line.

A line generator 212 generates and displays a smooth stiff line based on the coordinates of the points in the list updated by the coordinate evaluator 208 and the stiffness checker 210. In one non-limiting instance, the line generator 212 generates the smooth stiff line by using a sliding window covering a set of coordinates of the points corresponding to a predetermined length such as 10 millimeters or other length. The line generator 212 can fit a straight line to the set of pixels based on model curve such as a Gaussian, linear or other model curve. By way of example, for a particular point on the smooth stiff line, the point may be determined based on a set of points before the particular point and a set of points after the particular point (e.g., ±4 points).

In another non-limiting instance, the line generator 212 generates the smooth stiff line by using a sliding window covering a set of coordinates of the points corresponding to a predetermined time frame such as 10 seconds or other time duration. The line generator 212 can fit a straight line to the set of pixels as discussed above and/or otherwise. With a time based smoothing algorithm, the speed at which the user draws the line impacts the fit. As such, the user can influence the fit by adjusting the speed at which the line is drawn. This may facilitate correcting the smooth stiff line where speeding up or slowing down would result in a desired segment of the smooth stiff line.

The line generator 212 outputs the generated line for visual presentation via a display of the output devices 128. It is to be appreciated that the coordinate evaluator 208 and the stiffness checker 210 update the list of points in response to each new point or set of points and that that the line generator 212 generates a new smooth stiff line based on the most recent updated set of points, and not a previously generated smooth stiff line. Again, the smooth stiff line is generated independent of the background image and over the background image. The points of the line drawn using the input device 126 is not displayed.

FIG. 3 shows an example of a smooth stiff line 300 generated by the line generator 212. In FIG. 3, an x-axis 302 represents an x coordinate, and a y-axis 304 represents a y coordinate. A first coordinate 306 represents a start point of the smooth stiff line 300, and a second coordinate 308 represents an end point of the smooth stiff line 300.

A wiggly fee hand line 310 corresponds to the coordinates of the originally drawn line. The fee hand line 310 is not displayed with the smooth stiff line 300, but shown in FIG. 3 for explanatory purposes. Regions 312 and 314 correspond to corrections where the input device 126 backtracked and coordinates were removed from the list and not included in the creation of the smooth stiff line 300.

FIG. 4 shows an example in which a background image 400 is a CT image of a portion of a lung, including a fissure (not visible because it is behind a smooth stiff line 404). In this example, a wiggly fee hand line 402 has been drawn with respect to the lung fissure. Again, the wiggly fee hand line 402 is not displayed, but shown her for explanatory purposes.

The smooth stiff line 404 is the line generated and visually displayed by the image processor 118 based on the updated point list. The smooth stiff line 404 is shown as extending between two different points on a perimeter of the lung. However, the smooth stiff line 404 does not have to extend as such and may touch only one of the points on the perimeter or neither point on the perimeter.

Returning to FIG. 2, the smooth stiff line is saved in response to an input indicating the line is finished being drawn. A saved smooth stiff line can subsequently be edited, including extended and/or corrected. In addition, one or more additional smooth stiff lines and/or line segments can be generated and overlaid over the displayed background image.

Furthermore, one or more smooth stiff lines can be generated and saved for a plurality of different two-dimensional images from the volumetric image data. Moreover, one or more of the smooth stiff lines (e.g., the smooth stiff line 406 of FIG. 4) of one or more images can be used to segment tissue of interest from an image. This includes two-dimensional (2D) and three-dimensional (3D) segmentations.

Generally, the effect is a rendered smooth stiff line which can be corrected very easily in mid-course of its creation and intuitively without interruption of the drawing movement by simply tracing the line back a little and redrawing the last piece until the user is satisfied. In addition, the smoothing makes the interaction highly efficient as it is less sensitive to the exact input. Thus, a quick and rough drawing can lead to a precise and desired line with minimal interaction.

FIG. 5 illustrates an example method in accordance with the disclosure herein.

It is to be appreciated that the ordering of the acts is not limiting. As such, other orderings are contemplated herein. In addition, one or more acts may be omitted and/or one or more additional acts may be included.

At 502, an image is loaded and displayed. As discussed herein, the image may be an image (slice) from CT volumetric image data generated by the imaging system 100 or other system and/or other image data.

At 504, an input indicative of a line being drawn over the displayed image is received. As discussed herein, the input can be from an input device such as a mouse, a stylus, a touch sensitive area of a touchscreen, etc.

At 506, as the line is being drawn, each point is tracked. As discussed herein, this may include tracking the points or x,y coordinates of the line with respect to a geometry of the display screen.

At 508, as each point is tracked, a principal direction of the line being drawn is determined.

At 510, if the principal direction indicates the line is being corrected, points corresponding to a portion of the line being erased are discarded. As discussed herein, this may include determining whether a most recently received point is in front of or behind previously received points.

At 512, the remaining points are evaluated based on predetermined line stiffness criteria. As discussed herein, the predetermined line stiffness criteria defines a radius of curvature and may be a default, an object specific, a user set, etc. line stiffness criteria.

At 514, if the remaining points fail the predetermined line stiffness criteria, selective points are discarded until the points satisfy the predetermined line stiffness criteria.

At 516, a smooth stiff line is generated based on the remaining points, and the smooth stiff line is visually displayed. As discussed herein, the smooth stiff line is updated based on the points and not on a previously generated smooth stiff line, and a suitable non-limiting algorithm includes a sliding window based Gaussian, linear, etc. model.

At 518, the smooth stiff line is saved. As discussed herein, this can be based on input from the input device.

Optionally, the smooth stiff line can be edited and/or one or more smooth stiff lines can be added to the image. Optionally, one or more smooth stiff lines can be created for one or more other images from the volumetric image data.

The above may be implemented by way of computer readable instructions, encoded or embedded on computer readable storage medium, which, when executed by a computer processor(s), cause the processor(s) to carry out the described acts. Additionally or alternatively, at least one of the computer readable instructions is carried by a signal, carrier wave or other transitory medium.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

The invention claimed is:

1. A method, comprising:
  displaying a background image on a display screen;
  receiving, from an input device, a signal indicative of a free hand line being drawn over the background image, wherein the signal includes coordinates of points of the free hand line with respect to the display screen and the free hand line is independent of content represented in the background image;
  storing the signal in a storage device;
  determining a principal direction of the free hand line based on the signal;
  determining a radius of curvature of the free hand line based on the principal direction of the free hand line;
  comparing the determined radius of curvature with predetermined line stiffness criteria;
  successively removing points from the storage device in response to the determined radius of curvature not satisfying the predetermined line stiffness criteria;
  generating a smooth stiff line based on the stored signal; and
  displaying the smooth stiff line over the background image.

2. The method of claim 1, further comprising:
  determining whether a most recently received point of the free hand line lies beyond a previously received point of the free hand line with respect to the principal direction; and
  removing the previously received point from the storage device in response to the previously received point lying beyond the most recently received point with respect to the principal direction, the background image being created with image data generated by an imaging system.

3. The method of claim 2, further comprising:
  retaining the previously received point in the storage device in response to the previously received point not lying beyond the most recently received point with respect to the principal direction.

4. The method of claim 1, wherein points are removed from the storage device until the determined radius of curvature satisfies the predetermined line stiffness criteria.

5. The method of claim 1, further comprising:
  generating the smooth stiff line based on the remaining points in the storage device signal based on a sliding window by fitting the points in the window to a model.

6. The method of claim 5, wherein the model is a weighted function.

7. The method of claim 6, wherein the weighted function is a Gaussian function.

8. The method of claim 5, wherein the window includes points corresponding to one of a predetermined length or predetermined time duration.

9. The method of claim 1, wherein a subsequently generated smooth stiff line is generated based on the stored points and not a previously stored smooth stiff line.

10. The method of claim 1, wherein the predetermined line stiffness criteria comprises an allowable radius of curvature.

11. The method of claim 1, wherein the predetermined line stiffness criteria is based on an object in the background image.

12. An image processor, comprising:
  a memory that stores coordinates of points of a free hand line being drawn over a background image visually presented on a display, wherein the free hand line is independent of content represented in the background image; and
  a processor that generates and displays a smooth stiff line over the background image based on the stored coordinates of the points of the free hand line being drawn over the background image, wherein the processor determines a principal direction of the free hand line based on the stored coordinates of the points, determines a radius of curvature of the free hand line based on the principal direction of the free hand line, compares the determined radius of curvature with predetermined line stiffness criteria, and successively removes points from the memory in response to the determined radius of curvature not satisfying the predetermined line stiffness criteria until the determined radius of curvature satisfies the predetermined line stiffness criteria; and
  the background image being created with image data generated by an imaging system.

13. The image processor of claim 12, wherein the processor determines whether a most recently received coordinates of the points of the free hand line lies beyond a previously received point of the free hand line with respect to the principal direction, removes the previously received point from the storage device in response to the previously received point lying beyond the most recently received point with respect to the principal direction.

14. The image processor of claim 13, wherein previously received coordinates of the points in the storage device not lying beyond the most recently received point with respect to the principal direction are retained.

15. The image processor of claim 12, wherein the processor generates the smooth stiff line based on the remaining points in the memory based on a sliding window by fitting points in the window to a model.

16. The image processor of claim 15, wherein the model is a weighted function.

17. The image processor of claim 16, wherein the weighted function is a Gaussian function.

18. The image processor of claim 15, wherein the window includes points corresponding to a predetermined length.

19. The image processor of claim 15, wherein the window includes points corresponding to a predetermined time duration.

20. A non-transitory computer readable storage medium encoded with computer readable instructions, which, when executed by a processer, causes the processor to:
- display a background image on a display, wherein the background image include pixels that represent a lung of a subject;
- receive, from an input device, a coordinates of points of a wiggly free hand line being drawn over a fissure represented in the background image,
  wherein the wiggly free hand line is independent of content of the lung in the background image;
- store the coordinates of points in a storage device;
- process the coordinates of the points in the storage device to remove coordinates that correspond to an erased segment of the wiggly free hand line;
- process the coordinates of the points in the storage device to remove coordinates that result in the coordinates failing a predetermined stiffness criteria, wherein the processor determines a principal direction of the free hand line based on the stored coordinates of the points, determines a radius of curvature of the free hand line based on the principal direction of the free hand line, compares the determined radius of curvature with predetermined line stiffness criteria, and successively removes points from the storage device in response to the determined radius of curvature not satisfying the predetermined line stiffness criteria until the determined radius of curvature satisfies the predetermined line stiffness criteria;
- generate a smooth stiff line representing the fissure based on the remaining stored coordinates; and
- display the smooth stiff line over the background image with respect to the fissure, wherein the stored coordinates of points are not displayed over the background image.

* * * * *